April 28, 1931.     G. D. GARDNER     1,802,972
ARTICHOKE CORING MACHINE
Filed Feb. 20, 1928     2 Sheets-Sheet 1
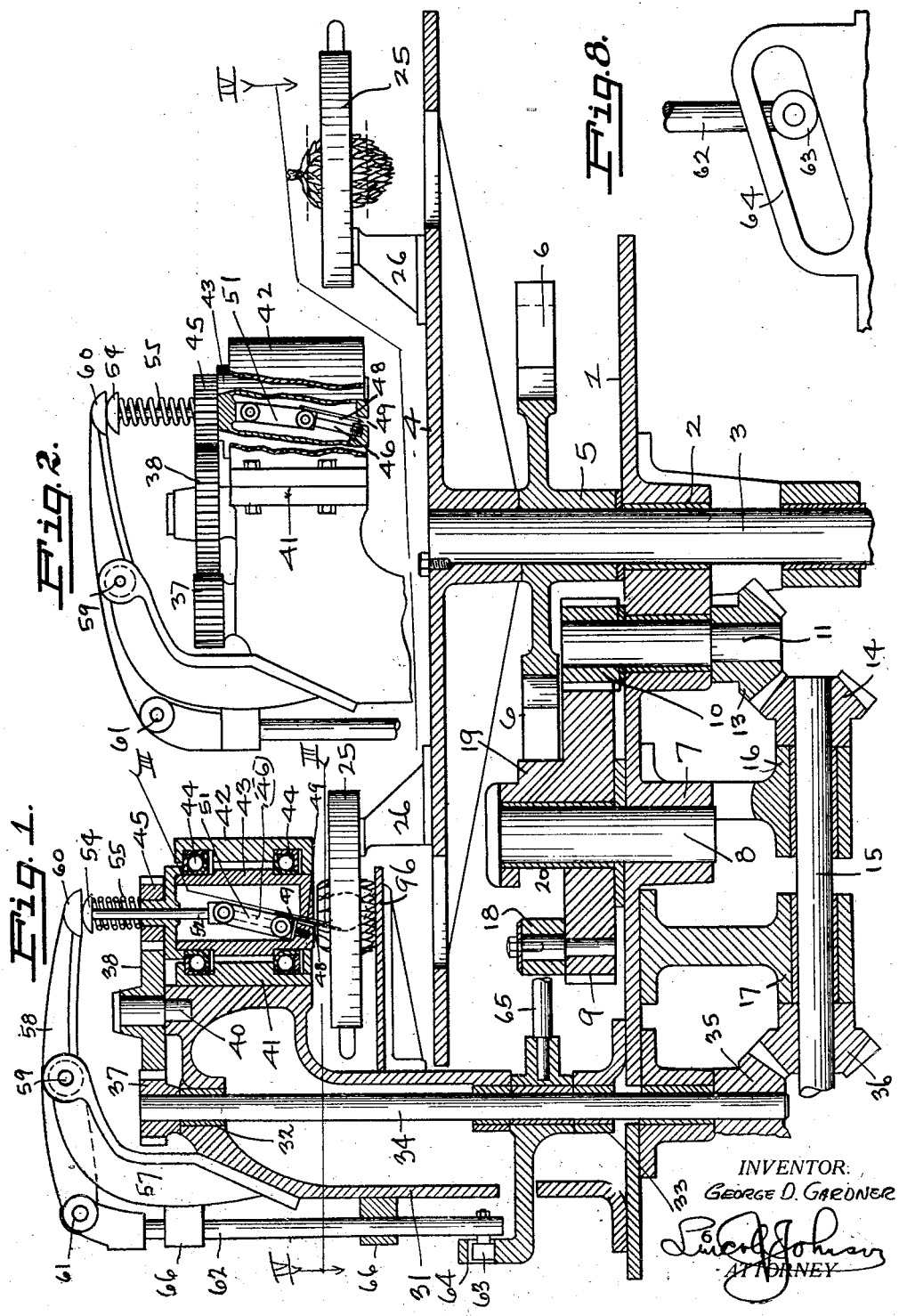
INVENTOR:
George D. Gardner April 28, 1931.  G. D. GARDNER  1,802,972
ARTICHOKE CORING MACHINE
Filed Feb. 20, 1928  2 Sheets-Sheet 2
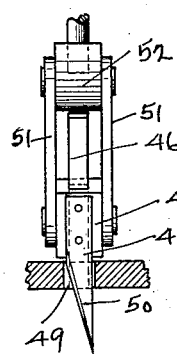
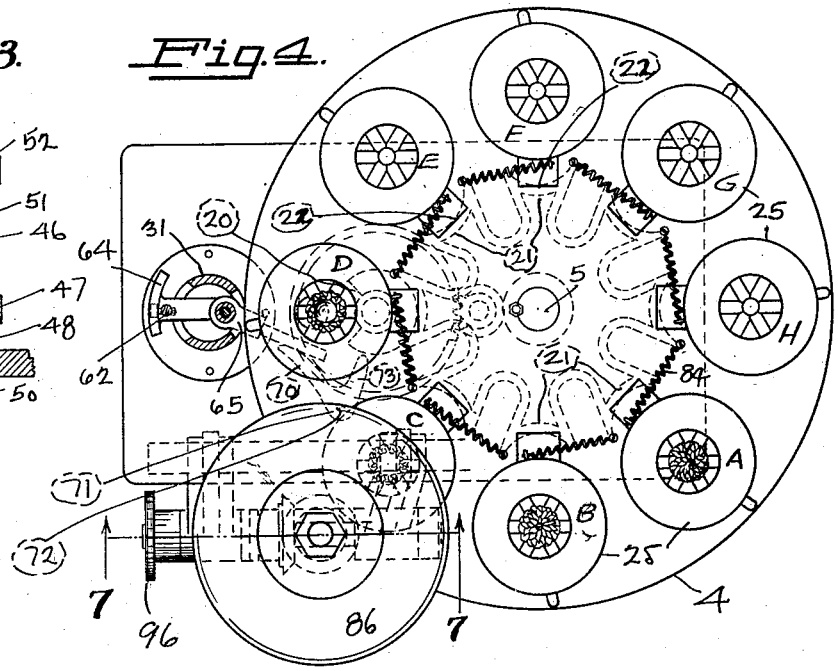
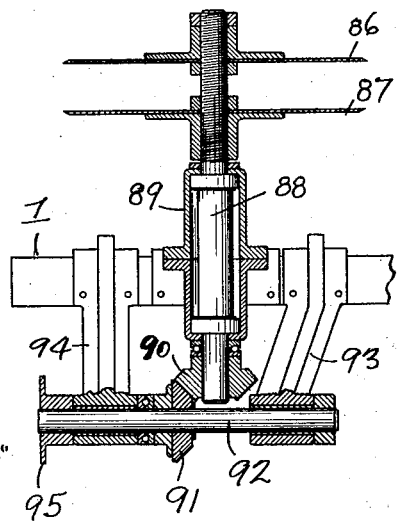
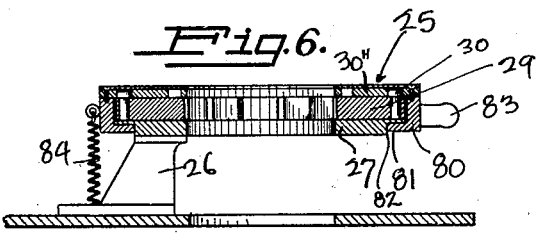
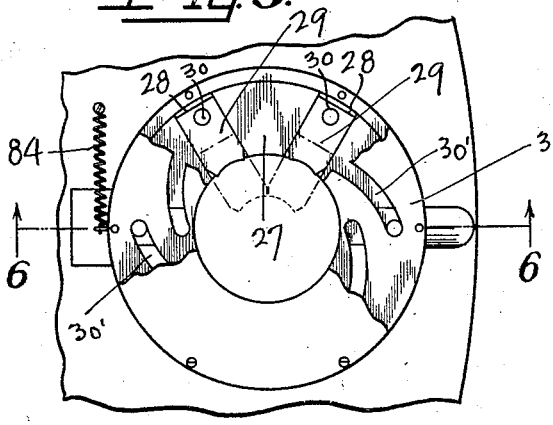
INVENTOR.
GEORGE D. GARDNER
ATTORNEY Patented Apr. 28, 1931

1,802,972

UNITED STATES PATENT OFFICE

GEORGE D. GARDNER, OF SAN JOSE, CALIFORNIA, ASSIGNOR, BY MESNE ASSIGNMENTS, TO BARRON GRAY PACKING COMPANY, OF SAN JOSE, CALIFORNIA, A CORPORATION OF CALIFORNIA

ARTICHOKE-CORING MACHINE

Application filed February 20, 1928. Serial No. 255,516.

This invention relates particularly to an apparatus for trimming, paring, pitting and coring the heart, core, or pit from fruit and vegetables.

An object of the invention is to provide an apparatus for automatically separating the heart, core or pit from the body of fruits and vegetables, and in particular for cutting the heart or core from artichokes.

A further object of the invention is to provide an artichoke coring machine provided with a plurality of holders for holding artichokes to be cored, and an intermittent actuating means to deliver the artichokes to be cored below a coring knife which is adapted to be penetrated into the heart of the artichoke at a divergent angle, and to be rotated around the artichoke substantially in the plane with the leaves thereof.

A still further object of the invention is to provide a fruit or vegetable coring machine having a plurality of holders for the fruit or vegetables to be cored, and a reciprocable knife in registry with the fruit or vegetable holders adapted to be concealed when an article to be cored is moved into registry with or removed from registry with said knife, and to be projected into the article to be cored when in registry therewith, in conjunction with a pair of rotary knives for cutting off the top and bottom of the fruit or vegetable an equal distance above and below the opposite face of the holder.

Other objects of the invention are to provide a fruit or vegetable coring, paring, trimming or pitting machine having an intermittent feeding means for advancing the article to be cored, trimmed, pared or pitted into registering engagement with a knife, timed to pare, trim, core or pit the said article at the moment of substantial registry with said knife; and to provide an apparatus such as will be hereinafter described, that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying two sheets of drawings:

Fig. 1 represents a vertical cross section through a machine constructed in accordance with my invention, for coring, paring, trimming or pitting the core or pit from fruit and vegetables, showing the coring knife in an operating position.

Fig. 2 is a fragmentary section of the coring knife showing it in the concealed position.

Fig. 3 is an enlarged fragmentary front elevation of the coring knife, taken on the line 3—3 of Fig. 1.

Fig. 4 is a plan view, of reduced scale, taken through Fig. 1 on line 4—4.

Fig. 5 is an enlarged plan view of one of the fruit or vegetable holders, partly broken away to show the interior construction thereof.

Fig. 6 is a cross section taken through Fig. 5 on the line 6—6.

Fig. 7 is a section through the trimming knives, taken on the line 7—7 of Fig. 4.

Fig. 8 is an enlarged plan view of the lifting rod and cam for actuating the cutting knife moving means.

In detail, the construction illustrated in the drawings comprises a base 1 provided with a bearing 2 thereon, in which a shaft 3 is rotatably mounted, to rotate on a vertical axis. An end of the shaft 3 projects above the upper face of the base 1, and is provided with a circular table 4 fixedly mounted thereon. The table 4 is rotated or moved with a regular intermittent motion, by a driven or "Geneva" wheel 5 that is keyed to the shaft 3 between the bottom of the table 4 and the upper face of the base 1. The driven wheel 5 is provided with a plurality of radial slots 6 located around the periphery thereof.

A vertically disposed bearing 7 is provided on the face of the base 1, in which a stub shaft 8 is rotatably mounted. A driving gear 9 is keyed to the shaft 8 and said driving gear 9 meshes with a driving pinion 10 that is keyed to a shaft 11 journaled in the base 1. The lower end of the pinion shaft 11 is provided with a beveled gear 13 thereon that meshes with a companion beveled gear 14 fixed on a drive shaft 15 that is supported in bearings 16 and 17 arranged on the under side of the base 1. The shaft 15 is connected to a driving motor or driving pulley that is not shown.

The driving gear 9 is provided with a roller 18 that projects above the upper face thereof and said roller is adapted to engage one of the slots 6 in the driven wheel 5 each time it (said roller) makes a revolution, thus turning the driven "Geneva" wheel a portion of a revolution and consequently turning the table 4 a portion of a revolution. A circular boss 19 is provided on the upper face of the drive gear 9 and said boss is cut away at 20 to provide a clearance space for the projecting arms 21 on the driven "Geneva" wheel, which said arms 21 form the sides of adjacent slots 6 in the "Geneva" wheel. The concentric exterior of the boss 19 engages the concave surface 22 on the outer edge of each of the projecting arms 21, between each pair of slots 6, to prevent the driving roller 18 from becoming disengaged from the driven wheel 5, and which also prevents the latter from rotating while the roller is moving around to engage the next successive slot. The form of "Geneva" mechanism illustrated for imparting an intermittent rotary motion to the table 4 is a conventional one, and it would be clearly within the purview of the invention to substitute some other form of intermittent motion actuating means for moving the table 4.

The upper face of the table 4 is provided with a plurality of fruit or vegetable holders or grippers 25, mounted in spaced circumferential relation therearound. Each gripper 25 is mounted on an upstanding bracket 26 that is fixedly attached to the upper face of the table 4. A ring base plate 27 is secured on one side of its circumference to the bracket 26, whereby said ring plate 27 lies on a plane exactly parallel to that of the table face 4. The ring plates 27 are mounted on the bracket plates 26 inwardly from the outer circumference of the table 4 whereby the outer peripheries of the plates 27 are substantially adjacent the outer circumference of the table 4, and the space between the outer ends of the plates 27 and table 4 is unobstructed. The upper face of the ring plate 27 is provided with a plurality of radially disposed slots or grooves 28 cut therein. A fruit or vegetable gripper 29 is slidably mounted in each slot 28 and a pin 30 is provided in each gripper 29 to extend above the upper face thereof. A ring plate 30" is arranged over the top of the base ring 27 and over the gripper members 29 that are counter-sunk in grooves in said plate. The upper plate 30" is provided with a plurality of tangentially curved slots 30' therein, within which the projecting end of each of the gripper pins 29 are slidably confined. Rotating the upper ring plate 30" with the tangentially curved slots 30' therein, causes the slidably mounted grippers 29 to be advanced or withdrawn, radially outwardly or inwardly relative to the center of the ring base plate 27. An annular ring or bezel 80 encircles the circumference of the ring base plate 27 and the upper side of said bezel 80 is attached to one side of the circumference of the plate 30". The bottom circumference of the bezel 80 is provided with an annular flange 81 thereon that engages an annular recess 82 on the bottom circumference of the ring plate 27. A handle 83 is provided on the outside of the bezel 80 to rotate the cam plate 30" relative to the ring base plate 27 to move the grippers 29 in or out. An expansion spring 84 is connected at one end to the bezel 80 and at its opposite end to the table 4 to resist turning movement of the handle 83 and to act on the cam plate 30 to maintain the individual grippers 29 in either an extended or concealed position.

In order to place an article in each gripper to be pared, trimmmed, cored, or pitted, the operator moves the handle 83 to rotate the cam plate 30" and slide the individual grippers 29 back into a concealed position, permitting the article to be inserted into the center of the gripper. The operator then releases the handle, and the spring 84 automatically moves the individual grippers radially into the extended position into engagement with the article to be worked upon, to hold said article in a relatively fixed position in the center of the holder 25 during the time that it is being cored, trimmed, pared or pitted. The individual grippers 29 are designed to center the article to be worked upon in line with the vertical axis of the holder 25, whereby said articles will properly register with the coring knife when moved into juxtaposition therewith.

On one side of the base 1 I have provided a vertical standard 31 having suitable aligned bearings 32 and 33 therein, in which a shaft 34 is rotatably mounted on a vertical axis, in parallel alignment to the axis of the table shaft 3. The lower end of the standard shaft 34 is provided with a beveled gear 35 thereon that meshes with a companion beveled gear 36 arranged on the driving shaft 15. The upper end of the shaft 34 is provided with a pinion 37 thereon. The pinion 37 meshes with an idler gear 38 that is rotatably mounted on a shaft 40 journaled in the upper end of the standard 31. An end of the standard 31 is faced off, at 41, on a vertical plane that is parallel to the axis of the table shaft 3. A circular housing 42 is bolted onto the faced end of the standard 31 and the center axis of the housing 42 is adapted to register, approximately, with the center axis of each of the fruit or vegetable grippers 25. A casing 43 is rotatably mounted on anti-friction bearings 44 located at each of its opposite ends, concentrically within the housing 42. The upper end of the casing 43 is provided with a spur gear 45 thereon that meshes with the idler gear 38. The casing 43 is thus driven by the spur gear 45 in the same direction of rotation as that of the shaft 34 in the standard 31.

A square guide shaft 46 is arranged within the interior of the casing 43, in a vertically and angularly inclined position. The shaft 46 is provided with a slide member 47 thereon, to one side of which a knife 48 is fixedly secured. The knife 48 is adapted to register with and lie in a slot 49 and is provided with a cutting edge 50 on one side thereof to cut in the direction of rotation of the casing 43. The guide shaft 46 is arranged on an inclined position within the casing 43, so that the slide member 47 with the knife 48 thereon lies in the same inclined or angularly disposed position, whereby the knife 48 as it rotates with the casing 43 prescribes a circular movement after it is projected from the casing 43 to thus cut a circular slot in any object into which it is penetrated, at a divergent angle to the vertical axis of the object being cored.

The knife slide 47 is pivotally connected by a pair of links 51 to an end of a shaft 52 that is journaled concentrically within the casing 43. The shaft 52 extends above the upper end of the casing 43 and is provided with a head 54 on the end thereof. An expansion spring 55 is interposed between the under side of the head 54 and the upper end of the casing 43. The shaft 52 is arranged on the axis of rotation of the casing 43, while the knife slide 47 is arranged off of said true axis of rotation, and hence the links 51 connect the lower end of the shaft 52 and knife slide 47 in desirable relation, whereby the vertical reciprocating movement of the shaft 52 relative to the casing 43 causes the knife 48 to be projected from or drawn into the casing 43. The expansion spring 55 normally tends to keep the cutting knife 48 concealed within the rotary casing 43 and out of the path of travel of the grippers 25.

In order to project the cutting blade 48 from the rotary casing 43 into the path of travel of the grippers 25, I provide a bracket 57 on the upper side of the standard 31, and to said bracket a walking beam 58 is pivoted at 59. One end 60 of the beam 58 engages the head 54 on the shaft 52 that controls the reciprocative or in and out movement of the knife 48. The opposite end of the beam 58 is pivotally connected at 61 to a lift rod 62 that is slidably mounted in bearings 66 provided on the exterior of the standard 31. The lower end of the lift rod 62 is provided with a roller 63 thereon, which said roller, is confined within an inclined cam track 64. The cam 64 is pivotally mounted upon the shaft 34 within the standard 31. The cam 64 is also provided with an arm 65 thereon that is adapted to be engaged by the roller 18 on the drive gear 9. Thus as the drive gear 9 rotates, the roller 18 thereon is moved into contact with the arm 65 on the cam 64, and the said cam 64 is swung from the inoperative position shown in Fig. 4 to the operative position shown in Fig. 8. The swinging or arcuate movement of the cam 64 causes the inclined face of the cam 64 to be advanced under the roller 63 on the lift rod 62, and the said lift rod elevates the walking beam 58 which in turn lowers the shaft 52 into the casing 43 and causes the cutting blade 48 to be projected from the other end of said casing 43. The position of the cam in Fig. 4 positions the cutting knife in the concealed position shown in Fig. 2, and when the cam 64 is moved to the operative position shown in Fig. 8, the cutting knife is moved into the operative position shown in Fig. 1. The cam 64 is returned from the operative to the inoperative position by a leg 70 of a bell crank 71 that is pivoted to the base 1, at 72. The bell crank 71 is provided with a leg 73 thereon that lies in the path of movement of the roller 18. The roller 18 first engages the arm 65 on the cam to move the cam from the inoperative to the operative position, and in the next movement the roller 18 engages the leg 73 of the bell crank 71 and causes the other leg of the bell crank 70 to engage the cam arm 65 to return the said cam from the operative to the inoperative position.

The casing 43 having the cutting knife therein is constantly rotating at a high rate of speed and the cutting knife is only projected from the enclosing casing throughout an arc of travel of about fifteen or twenty degrees of the roller 18, on the drive gear 9.

The cutting knife 48 is only adapted to be projected from the enclosing casing 43 into penetration with the fruit or vegetable to be trimmed, pared, cored or pitted during such time as the fruit or vegetable in the gripper is in registering alignment with the knife. The intermittent movement of the grippers 25 causes said grippers to be advanced step-by-step into registry with the cutting knife. During each intermittent stop movement, a gripper is positioned under the cutting knife, and the cutting knife is forced down into the fruit or vegetable at a divergent angle to the axis of the fruit or vegetable, prescribing a circular cut therein and severing a portion of the fruit or vegetable from the rest of the body so that it may easily be separated. After prescribing its flaring circular cut, the knife automatically draws back into the casing 43, the severed fruit or vegetable passes on to be removed from its gripper and an uncut fruit or vegetable takes its place beneath the cutting member.

In the operation of coring the fruit or vegetable, the operator first places a fruit or vegetable to be cored in the holder at the position and place assumed by the holder A in Fig. 4. As the holder A advances into position B, there is no particular function of the mechanism that takes place. As the holder A passes into position C, the holder passes between the spaced parallel cutting plates 86 and 87. The plates 86 and 87 are frictionally mounted on the shaft 88 which is rotatably mounted in a bearing 89 secured to the base 1 of the machine. The lower end of the shaft 88 is provided with a pivoted frictional driving element 90 which engages a friction drive member 91 mounted on a shaft 92 which is journaled at its opposite ends in bearings 93 and 94 secured to the frame 1 of the machine. The end of the shaft 92 is provided with a sprocket 95 thereon around which a sprocket chain 96 passes and which is connected to and driven by a driving mechanism that rotates the shaft 15. The cutting disks 86 and 87 and the unsupported end of each gripper 25 pass therebetween and the unedible pieces and stem as well as the tip leaves of the artichoke are cut off therefrom on a plane parallel with the table face 4. Likewise the plates cut the selected parts of the artichoke therefrom a predetermined spaced distance above and below each holder 25. As each holder moves from the position C, into the position D, in registry with the coring knife after the coring operation, a flat end surface on the artichoke is presented to the coring knife to permit the desired coring cut to be made. As each holder passes from the cutting disks 86 and 87, from the position C into the position D, the lowermost part of the artichoke passes from the upper surface of the cutting plate 87 onto the upper surface of a platform 96 that is mounted below the coring knife to prevent the said artichoke from moving downwardly during the time that the coring knife is projected into the artichoke, and prescribing the coring cut. After the coring operation has been performed, the holder moves to the position E, where the artichoke or cored article is released from the holder, and the holder then advanced around into the positions F, G and H, where, if desired, new fruit or vegetable to be cored, can be placed in the holders. The machine and apparatus is entirely automatic in its operation and the only manual labor involved is that of the human hands necessary to place the fruit, vegetables or other objects to be cored in the grippers. After the initial placement of the fruit or vegetables in the grippers, the same are automatically advanced in registry with the cutting knife, the cutting knife automatically enters the fruit or vegetable and withdraws therefrom to cut from the said fruit or vegetable the heart, core or pit thereof, in accordance with the material being worked upon.

Having thus described this invention, what I claim and desire to secure by Letters Patent is:

1. In combination with the carrier of an artichoke coring machine, a holder for the artichokes comprising an annular disc base, means extending from one side of the under face of said disc mounted on the carrier to support the base in spaced, parallel relation with the adjacent face of the carrier, a plurality of radial artichoke gripping bars slidably held on a face of the disc; and a plate rotatably mounted on said disc having a plurality of slots arranged tangentially to the axis of the plate, each bar being adapted to extend into a slot and being slid radially as the plate is rotated, said plate and said disc having apertures therethru in alignment with the gripping ends of said bars to allow the artichoke to protrude beyond both sides of the holder.

2. In combination with the carrier of an artichoke coring machine, a holder for the artichokes comprising an annular disc base, means extending from one side of the under face of said disc mounted on the carrier to support the base in spaced, parallel relation with the adjacent face of the carrier, a plurality of radial artichoke gripping bars slidably held on a face of the disc; and a plate rotatably mounted on said disc having a plurality of slots arranged tangentially to the axis of the plate, each bar being adapted to extend into a slot and being slid radially as the plate is rotated, said plate and said disc having apertures therethru in alignment with the gripping ends of said bars to allow the artichoke to protrude beyond both sides of the holder, said carrier having a discharge passage therethru in registry with the said apertures.

3. In combination with the carrier of an artichoke coring machine, a holder for the artichoke comprising an annular disc base, means extending from one side of the under face of said disc mounted on the carrier to support the base in spaced, parallel relation with the adjacent face of the carrier, a plurality of radial artichoke gripping bars slidably held on a face of the disc; and a plate rotatably mounted on said disc having a plurality of slots arranged tangentially to the axis of the plate, each bar being adapted to extend into a slot and being slid radially as the plate is rotated, said plate and said disc having apertures therethrough in alignment with the gripping ends of said bars to allow the artichoke to protrude beyond both sides of the holder, means for automatically rotating the plate in one direction to move the gripping bars inwardly, and spring actuated means whereby reverse movement is transmitted to the plate to retract the gripping bar.

In testimony whereof, I have hereunto set my hand at San Jose, California, this 24th day of January, 1928.

GEORGE D. GARDNER.